(12) United States Patent
Olsen

(10) Patent No.: US 10,042,147 B2
(45) Date of Patent: Aug. 7, 2018

(54) GLASS CONCENTRATOR MIRROR ASSEMBLY

(71) Applicant: SPAWAR Systems Center Pacific, San Diego, CA (US)

(72) Inventor: Randall B. Olsen, Carlsbad, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 15/379,247

(22) Filed: Dec. 14, 2016

(65) Prior Publication Data

US 2018/0164560 A1    Jun. 14, 2018

(51) Int. Cl.
*G02B 19/00*     (2006.01)
*G02B 7/183*     (2006.01)

(52) U.S. Cl.
CPC ......... *G02B 19/0042* (2013.01); *G02B 7/183* (2013.01); *G02B 19/0023* (2013.01)

(58) Field of Classification Search
None
See application file for complete search history.

(56) References Cited

U.S. PATENT DOCUMENTS

| 4,583,520 A | 4/1986 | Dietrich |
| 6,485,152 B2 | 11/2002 | Wood |
| 7,077,532 B1 | 7/2006 | Diver |
| 2014/0048121 A1* | 2/2014 | Schwartz ................ F24J 2/38 |
| | | 136/248 |
| 2014/0053607 A1 | 2/2014 | Angel |

FOREIGN PATENT DOCUMENTS

WO    WO2015130808 A1    9/2015

* cited by examiner

*Primary Examiner* — Jennifer D. Carruth
(74) *Attorney, Agent, or Firm* — SPAWAR Systems Center Pacific; Kyle Eppele

(57) ABSTRACT

A glass concentrator mirror assembly and a method for making same. A glass concentrator mirror assembly is configured to reflect sunlight to a receiver in a reflector assembly. The glass concentrator mirror assembly has at least one glass mirror. The at least one glass mirror has a reflective side and a back side. The glass concentrator mirror assembly also has a parabola-forming frame structure for the at least one glass mirror. The parabola-forming frame structure includes a sternum that is fixedly fastened to a spine with the at least one glass mirror therebetween. The parabola-forming frame structure facilitates a substantially parabolic curvature of the at least one glass mirror. The parabola-forming frame structure provides a substantially uniform force along a line of contact between the sternum and the at least one glass mirror.

18 Claims, 11 Drawing Sheets

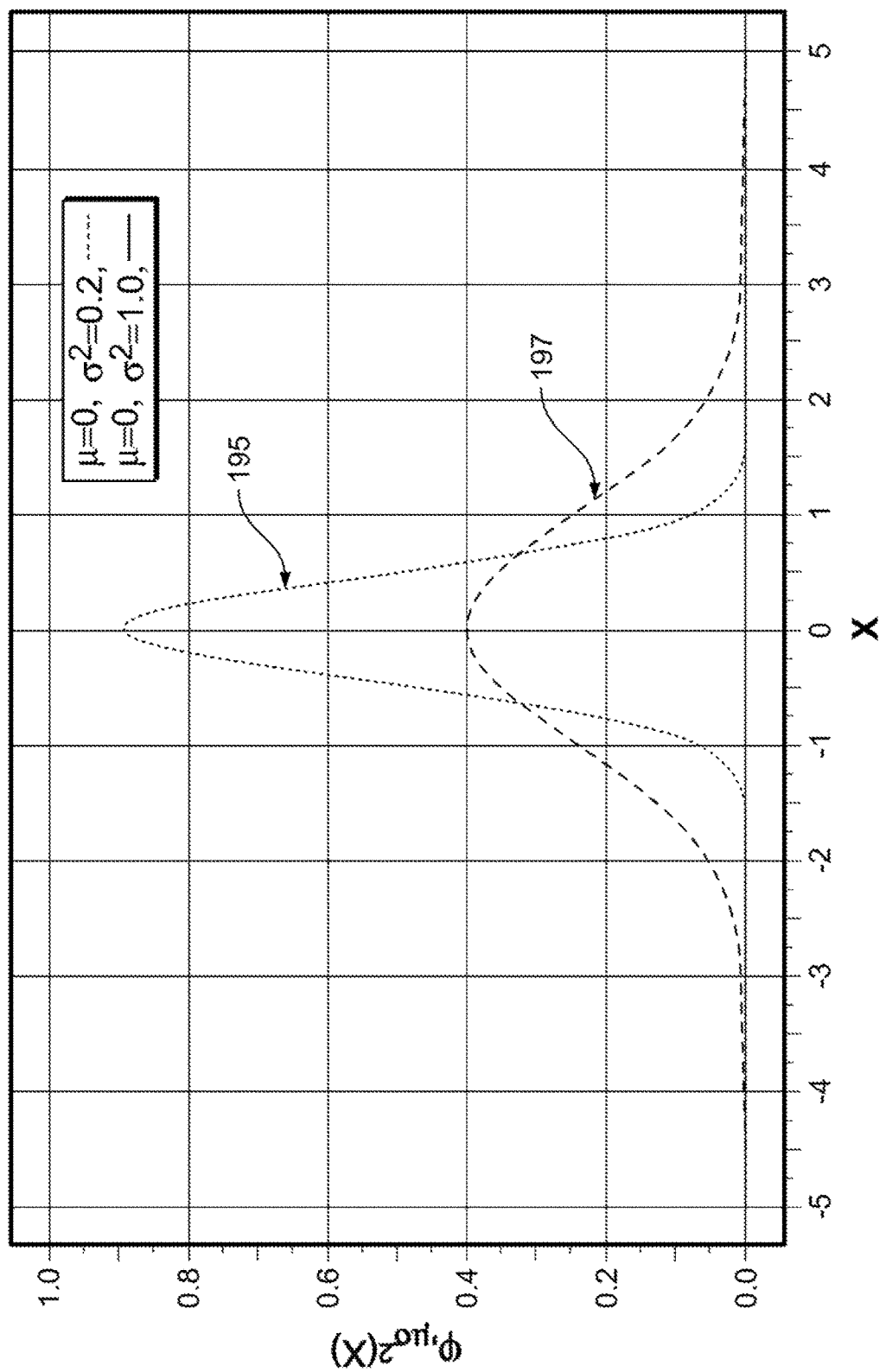

GLASS CONCENTRATOR MIRROR ASSEMBLY

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif. 92152; telephone (619)553-5118; email: ssc_pac_12@navy.mil. Reference Navy Case No. 102,667.

BACKGROUND OF THE INVENTION

Field of Invention

This disclosure relates to solar energy, and more particularly, to mirrors for solar energy concentrator systems.

Description of Related Art

Solar energy collection has become increasingly important. Solar energy is beneficial in that it does not require the use of the world's limited natural resources. Solar energy is also beneficial because it may be used to generate electricity with fewer environmental consequences than other media for generating electricity.

A variety of systems have been devised for the collection and utilization of solar energy. While man of these systems are quite efficient in accomplishing the objective, i.e. collecting and storing solar energy to supplement or replace more expensive systems utilizing common sources of energy, one primary problem remains. That problem is the initial cost of making and installing an efficient solar energy collecting system. If a solar energy collecting system is very expensive to make and install, such high capital expenditure is undesirable, since the potential user must wait too long to amortize this cost before realizing any savings in energy expense.

It is well known that solar energy may be converted into other useful forms of energy by using proper techniques. For example, solar energy may be converted into electrical energy by a so-called solar cell. The most common solar cells are made of silicon, but cells made of other materials, e.g., cadmium sulfide and gallium arsenide, have also been developed and tested. The required voltage and/or amperage may be generated using an appropriate series-parallel matrix in an integrated array.

At the current state of the art, a principal obstacle to wide scale adoption of solar cell energy collector installations is that manufacturing and installation costs of solar cell arrays generally are substantially higher than the cost of conventional electrical energy generating installations. Another factor limiting wide spread adoption of solar panel cells is radiant heating of the cells which reduces cell efficiency.

While the cost of manufacturing the solar cells per se currently is the single largest cost factor in the manufacture of a solar cell energy collector installation, any technique which increases the overall efficiency of a solar cell energy collector, or which reduces the cost of manufacturing and/or installing a solar cell energy collection system may have significant commercial importance.

In addition to the photoelectric conversion technique just described, it is well known that solar energy may be converted to other more useful forms of energy through thermal conversion techniques. Typically thermal conversion techniques involve using sunlight to heat up a liquid or gas contained in a thermal converter enclosure and then utilizing the heated liquid or gas in an appropriate manner well known to one skilled in the art to generate power.

However, as in the case of solar cells, relatively low energy collection efficiency, relatively high cost of manufacturing and relatively high installation costs have presented a principal obstacle to wide scale adoption of solar thermal energy collectors. Thus, any technique which increases the overall efficiency of a solar thermal energy collector of which reduces the cost of manufacturing and/or installing a solar thermal energy collector system may have significant commercial importance.

One technique the art has developed to increase efficiency of solar cells and thermal converters is to collect and focus solar energy onto the solar cells or thermal converters by means of a so-called "solar concentrator". Thus a typical solar energy collection system may include reflective or refractive devices which are designed to collect solar energy impinging upon a relatively large area and to focus the collected energy onto a relatively small area of utilization.

With respect to these reflectors, problems have been encountered in making them at a reasonable cost. Glass mirror collectors (or glass concentrator mirrors) are an example of one type of reflector. Glass mirror collectors can be made by machine-cutting an arc to form a curve. However, this machine-cutting requires specialized equipment and is expensive to manufacture. There is a need for a curved reflector or mirror for solar energy collection that is inexpensive and simple to manufacture.

BRIEF SUMMARY OF INVENTION

The present disclosure addresses the needs noted above by providing a glass concentrator mirror assembly for a reflector assembly. The glass concentrator mirror assembly is configured to reflect sunlight to a receiver. The glass concentrator mirror assembly comprises at least one glass mirror, the at least one glass mirror having a reflective side and a back side. The glass concentrator mirror assembly further comprises a parabola-forming frame structure for the at least one glass mirror. The parabola-forming frame structure includes a sternum that is fixedly fastened to a spine with the at least one glass mirror therebetween. The parabola-forming frame structure facilitates a substantially parabolic curvature of the at least one glass mirror that is substantially convex on the reflective side of the at least one glass mirror. The substantially parabolic curvature is configured to provide a focal length between the glass mirror and a receiver. The parabola-forming frame structure is configured to provide a substantially uniform force along a line of contact between the sternum and the at least one glass mirror.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of the glass concentrator mirror and method of making the glass concentrator mirror. In the drawings:

FIG. 2 is a graphical representation of light concentration distribution of the glass concentrator mirror in accordance with embodiments of the present disclosure.

DETAILED DESCRIPTION OF THE INVENTION

The present disclosure is directed to a glass concentrator mirror assembly and a method for making the same for solar energy collection. The glass concentrator mirror assembly is particularly suitable for use in concentrated solar energy systems. The glass concentrator mirror assembly may be manufactured at a low cost. The glass concentrator mirror assembly described herein may be used as a solar reflector, and may be made pan of a reflector assembly for solar energy collection.

Figure 1A:
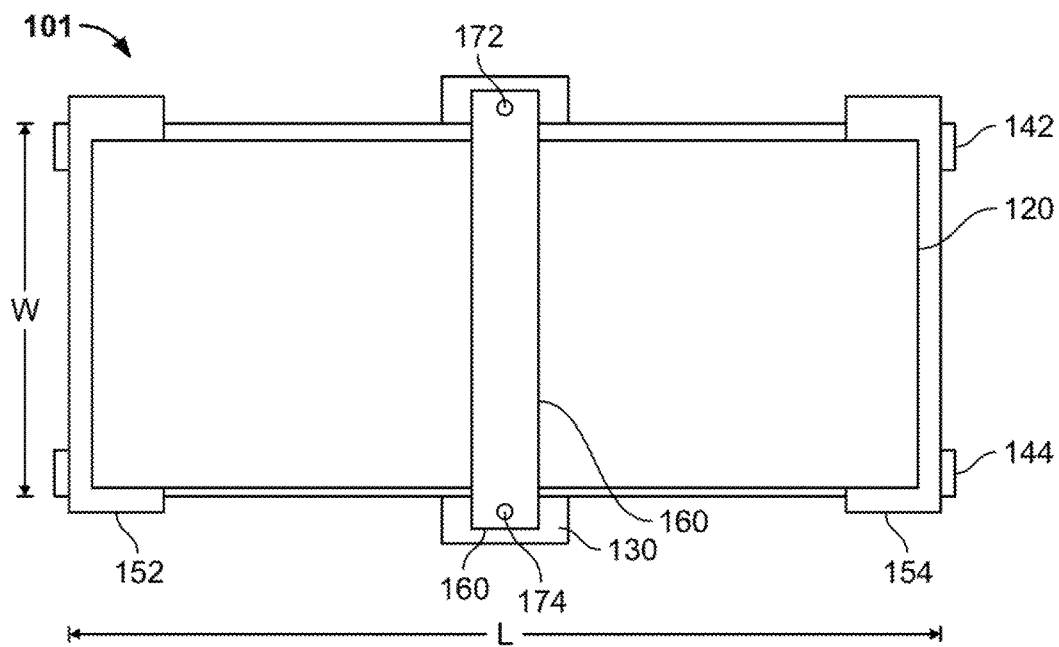
FIG. 1A shows a top view (or "sunny-side" view) of a glass concentrator mirror assembly in accordance with one embodiment of the present disclosure.

FIG. 1A shows a top view (or "sunny-side" or view) of a glass concentrator mirror assembly 101 in accordance with one embodiment of the present disclosure. Glass concentrator mirror assembly 101 comprises a glass mirror 120, a spine 130, upper rib 142, lower rib 144, left stringer 152, right stringer 154, and sternum 160. The sternum 160 is attached to the spine 130 by upper bolt 172 and lower bolt 174.

The reflective side of glass mirror 120 is shown in this view. When in use, this reflective side will face the sun. The glass mirror 120 looks similar to an ordinary flat mirror with a frame, as in the prior art. The length (L) of glass mirror 120 is greater than the width (W) of glass mirror 120.

Figure 1B:
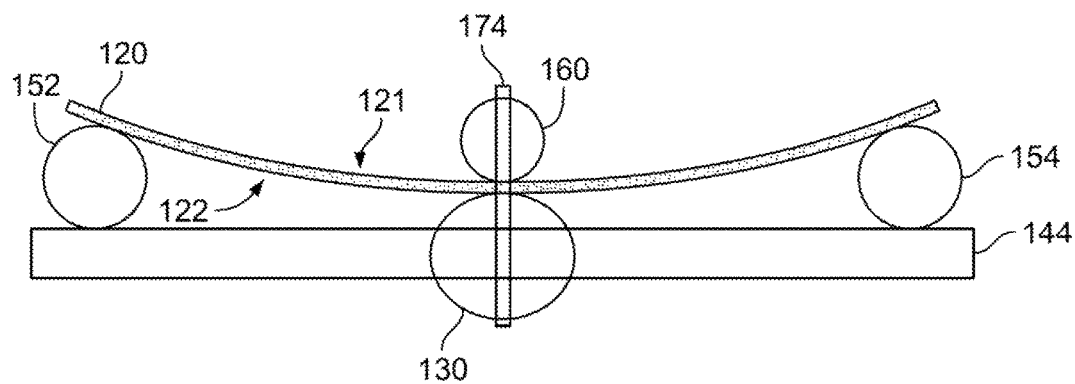
FIG. 1B shows an end view of the glass concentrator mirror assembly of FIG. 1A.

However, the present glass concentrator mirror assembly 101 is curved in a substantially parabolic shape, as illustrated in FIG. 1B. The curvature is a result of force or tension that is applied to the glass mirror 120 by various elements of its frame structure. Taken together, the spine 130, the upper rib 142, the lower rib 144, the left stringer 152, the right stringer 154, upper bolt 172 and lower bolt 174 comprise an example of a frame structure which may facilitate curvature of glass mirror 120.

Figure 1C:
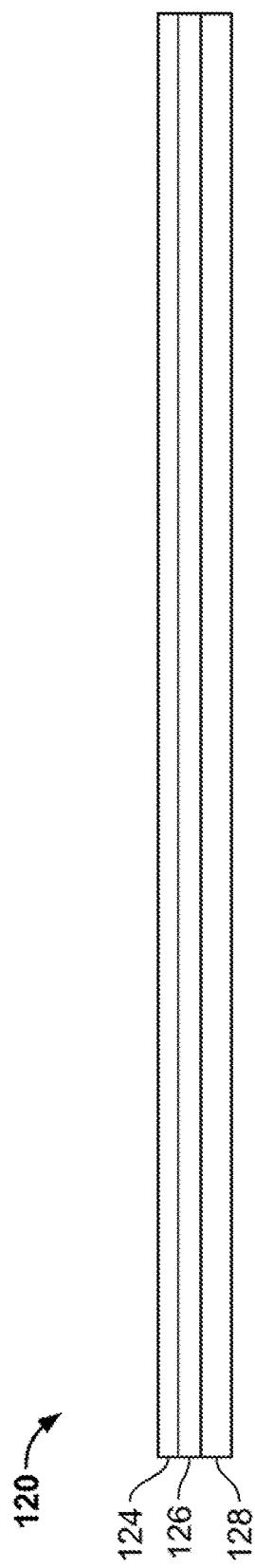
FIG. 1C shows the layers of a glass mirror in accordance with one embodiment of the present disclosure.

FIG. 1C, illustrates the layers of a glass mirror in accordance with one embodiment of the present disclosure. As shown in FIG. 1C, glass mirror 120 includes a glass layer 124, a silver backing 126 and an overcoat barrier layer 128. The overcoat battier layer 128 or other environmentally acceptable barrier layer may overcoat the silver backing 126 and glass layer 124 to provide weather resistance or to improve weatherability. Glass mirror 120 may be a low cost mirror, e.g., a conventional back-surface silvered mirror commonly used in architectural applications (e.g. a bathroom mirror). Such mirrors are in very high volume production. In its simplest form—even simpler than FIG. 1C—glass mirror 120 may be composed of a glass layer 124 with a silver backing. For some applications, nonglass substrates or superstrates may be provided for the rigid glass mirror 120. For example, polycarbonate (also known as "bulletproof glass") may be provided for applications where breakage resistance is a critical design requirement. The thickness of the glass in glass mirror may $\frac{3}{8}$ inch (3 mm approximately). Glass mirror 120 may be twenty-four inches (24") in length in the longer direction and six inches (6") to twelve inches (12") in width in the shorter direction, with twelve inches (12") being preferred to minimize part count.

Figure 1D:
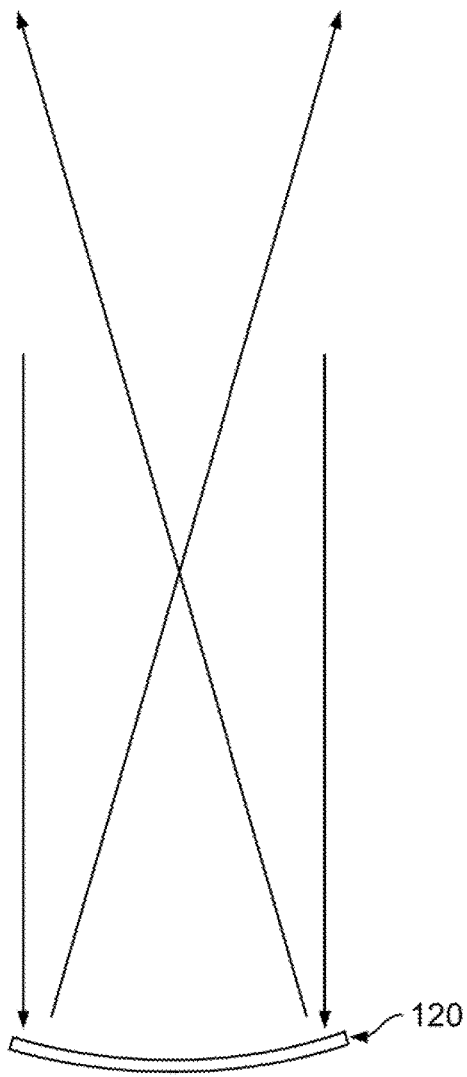
FIGS. 1D and 1E show two examples of degrees of curvature for the glass concentrator mirror in accordance with embodiments of the present disclosure.

FIG. 1D illustrates a glass mirror 120 with substantially parabolic curvature in accordance with one embodiment of the present disclosure. The degree of substantially parabolic curvature is important. If the mirror 120 is very curved, the light gathers closer to the glass mirror 120. With less curvature, the light gathers farther away from the mirror 120. Light that hits the glass mirror 120 is illustrated with arrows pointed toward glass mirror 120. This light then gets reflected and redirected from the glass mirror 120 into beams of light that cross over each other at or near a focal point. Presumably, a target (not shown), which may include the solar cells in a solar energy collector system, would be somewhere near this focal point.

Figure 1E:
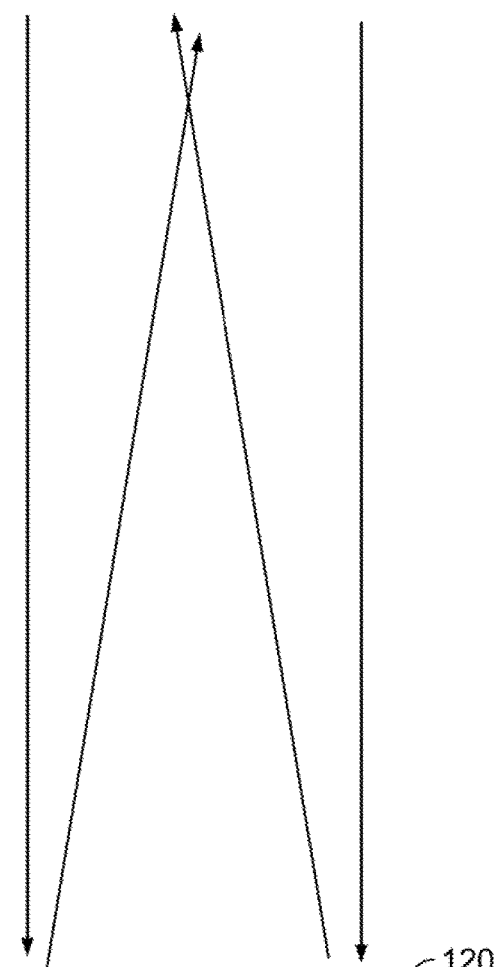

The focal length of the glass mirror 120 can be adjusted by changing the degree of curvature. Referring now to FIG. 1E, illustrated the glass mirror 120 with less curvature than in FIG. 1D. As with FIG. 1D, light that hits the glass mirror 120 is illustrated with arrows pointed toward glass mirror 120. This light then gets redirected into converging beams of light that eventually cross over each other. However, the crossover point is farther away from the glass mirror 120 in FIG. 1E than it is with FIG. 1D. The distance from the glass mirror 120 where the beam gets the narrowest may be referred to as the focal length. As shown in FIG. 1E when compared to FIG. 1D, the focal length gets shorter when less curvature is present.

Referring back to FIG. 1A, the glass mirror 120 is made of glass, which has a relatively high modulus of elasticity. Glass may have a tensile modulus (also known as Young's modulus or modulus of elasticity) of about fifty (50) to ninety (90) gigaPascals. Therefore, glass mirror 120 may bend, without breaking, to provide the desired degree of substantially parabolic curvature. For example, the degree of curvature for a mirror that is two feet (2') wide, a deviation front a straight line by about 0.5" at the center may generate a curve with a focal length that is about ten feet (10'). Sternum 130 may be composed of a stiffer material than glass mirror 120 in order to facilitate curvature.

Upper bolt 172 and lower bolt 174 may provide a force that is transmitted substantially uniformly along a line of contact between the sternum 160 and the mirror 120. As such, the upper bolt 172 and lower bolt 174 could be realized, in the extreme, by a tension element (e.g., a string or a wire which provides only a tension force). However, the upper bolt 172 and lower bolt 174 may also possess some lateral force restraining characteristics. In lieu of a bolt, a wide variety of fasteners may be used, including, but not limited to a screw, pin, anchor, bar, brad, catch, coupling, dowel, fastener, lag, latch, lock, peg, pipe, rivet, rod, skewer, spike, stake, staple, stud, clamp or clip.

The functionality of upper bolt 172 and lower bolt 174 (the bolts) can be provided by a wide variety of mechanical devices such as a preferred machine screw and machine nut. An alternative to the machine screw is a lag bolt. Lag bolts are commonly used in the art of fasteners. A lag bolt can be utilized in combination with a square punched hole in the sternum 160 (or the spine 130 it oriented in the opposite direction) to provide an assembly advantage. Because of this assembly advantage, a tool is not required to prevent the lag bolt from turning while the machine nut is applied. Additionally, the machine nut can be the most common type, a hexagonal nut which normally requires a tool, namely a wrench, to twist the nut into position. Alternatively the nut can be wing nut which does not require a tool to twist the wing nut into position.

By adjusting the geometry of the bolts (e.g., by adjusting the position of the screws along bolts) forcing the sternum 160 closer to the spine 130, a greater curvature can be produced in glass mirror 120. Thus, one can adjust the distance of maximal concentration (similar to focal length as this term is used in imaging optics) closer or farther from the mirror 120. As a result, the focal length can be adjusted in a simple, inexpensive manner using simple, inexpensive materials.

The spine 130, upper rib 142, lower rib 144, left stringer 152, right stringer 154, and sternum 160 may be made from metal tubes. Metal tubes may be relatively lightweight, and therefore low cost as the cost of many materials is based on weight/mass. For more weight-sensitive applications, the tubes may be aluminum. For highly cost-sensitive applications, the tubes may be galvanized steel and in many cases more specifically electrical metallic tubing (EMT) due their ready availability, high worldwide production volume and hence very low cost. Sternum 160 may be composed of a material (or a composite material) that is stiffer than the glass mirror 120 in order to facilitate curvature. This stiffness may be a function of the elastic modulus of the material that makes up sternum 160. This stiffness may also be provided by geometry. For example, if the sternum 160 were composed of a plastic, the tube may have to be very big or have a large cross-section. Fiberglass is another possible material for sternum 160. Fiberglass is less expensive and less heavy than aluminum. In lieu of circular or cylindrical tubes, a tube with a flat spot may be provided. However, such a tube with a flat spot may be more expensive as the cylinder would need to run through two rollers in order to create the desired shape.

The glass concentrator mirror assembly 101 additionally comprises one or more mechanisms for attaching the upper rib 142 and lower rib 144 to the spine 130. For example, the upper rib 142 and lower rib 144 may be attached to left stringer 152 and right stringer 154 by drilling holes in the tubes and connecting the tubes with screws and nuts that pass through the drilled holes. The left stringer 152 and right stringer 154 are substantially perpendicular to the upper rib 142 and lower rib 144. The left stringer 152 and right stringer 154 are substantially parallel with the spine 130. Since the connection between the upper rib 142, lower rib 144, left stringer 152 and right stringer 154 are put into compression, a wide variety of attachment means can be utilized including adhesives, punched features on the stringers and ribs, and other fasteners. The upper rib 142 and lower rib 144 may be attached to the spine 130 by drilling large diameter holes in the spine (e.g. a nominal 1 inch EMT) to allow upper rib 142 and lower rib 144 (e.g. nominal Y2 inch EMT) to slide through the spine 130. The upper rib 142 and lower rib 144 are sufficiently long to traverse the length of the spine 130. To further secure the upper rib 142 and lower rib 144, a secondary attachment mechanism can be added. For example, a screw or an epoxy bond can be added to prevent the ribs from sliding out after they have been attached. The spine 130 and sternum 160 may be disposed approximately midway across the length of the glass mirror 120. The spine 130 and sternum 160 are sufficiently long to traverse the length of the glass mirror. Referring back to FIG. 1B, illustrated is an end view of the glass concentrator mirror assembly of FIG. 1A. The glass mirror 120 has a reflective side 121 and a back side 122. As shown in FIG. 1B, the glass mirror 120 is located above the spine 130 and under the sternum 160. About midway across the length of the glass mirror 120, the sternum 160 is attached to the spine 130 by upper bolt 172 and lower bolt 174. Upper bolt 172 and lower bolt 174 may apply a force substantially uniformly along a line of contact between the sternum 130 and the glass mirror 120 causing the mirror 120 to curve. This line of contact runs down the width of the glass mirror 120. Light (e.g. sunlight) incident on the curved surface of glass mirror 120 is therefore subsequently concentrated after reflection at a distance above the mirror 120. As shown, glass mirror 120 is curved upward into a substantially parabolic shape. The curve is concave in relation to the reflective side, and the reflective side faces the sun. The curve is substantially parabolic, with the ends of the glass mirror 120 being arced upward from the middle. One end of the glass mirror is arced upward under the left stringer 152, while the other end of the glass mirror is arced upward under the right stringer 154.

In the present disclosure, the distance of maximal concentration is not referred to as a focal distance. This is because, for the most practical set of parameters for the glass concentrator mirror of the present disclosure, true imaging (even in a linear sense) is not generally produced. Rather, light is concentrated but not in a way that is well-described by a single Gaussian (about a line) distribution.

FIG. 2 illustrates a graphical representation of light concentration distribution for the glass concentrator mirror in accordance with one embodiment of the present disclosure. As shown, instead of a single Gaussian (about a line) distribution, what is observed is a pattern with two distinct distributions (about a line). One light concentration distribution 195 is narrow—as indicated by the dotted line—and the other light concentration distribution 197 is wide—as indicated by the dashed line. The other light concentration distribution 197 is perhaps of order 3× wider, but this ratio can vary considerably depending on how much deflection (curvature) has been impressed upon the glass mirror.

Figure 3:
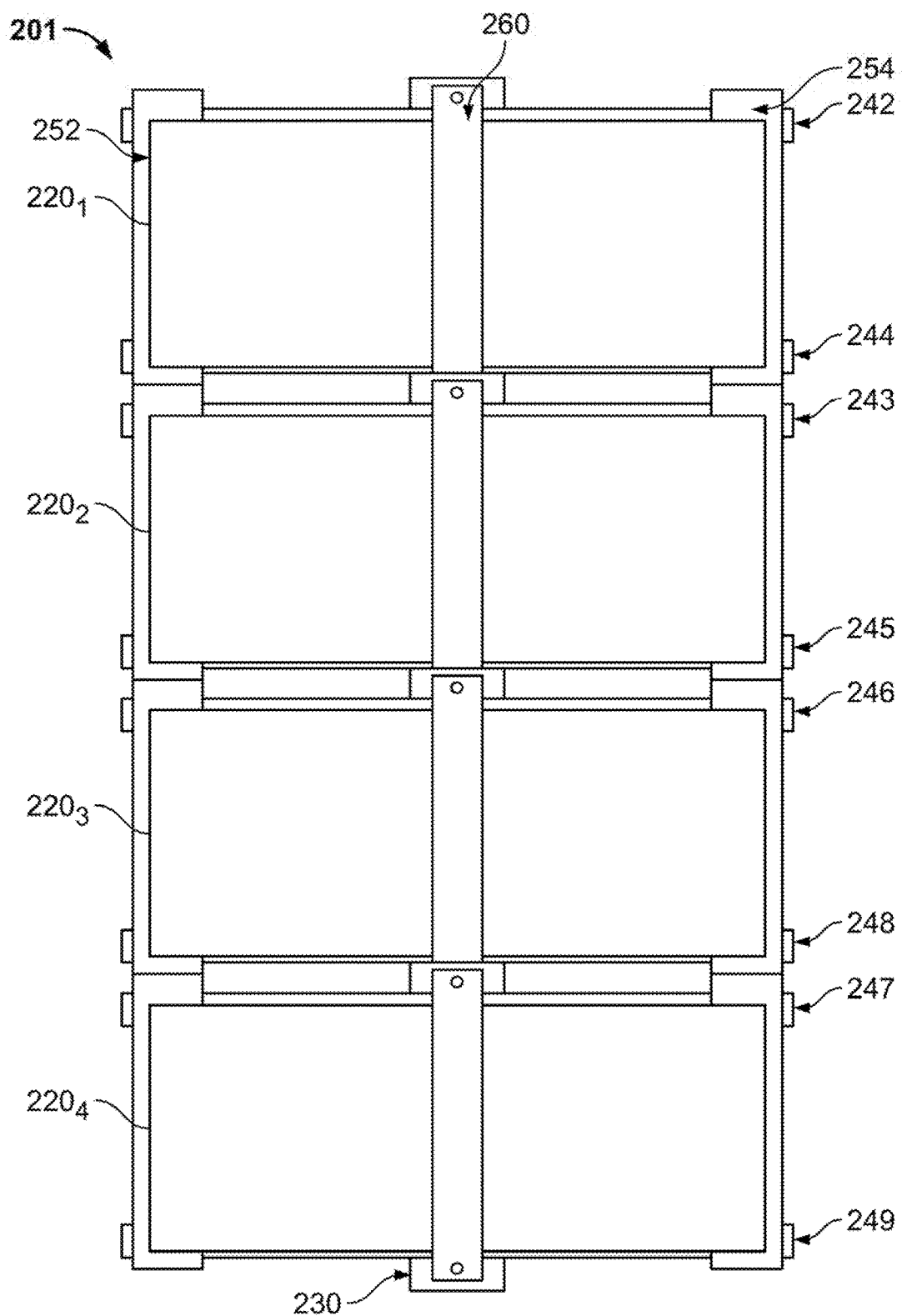
FIG. 3 illustrates a top view (or "sunny-side" view) of a glass concentrator mirror assembly which includes a plurality of glass mirrors in accordance with one embodiment of the present disclosure.

FIG. 3 illustrates a top view (or "sunny-side" view) of a glass concentrator mirror assembly 201. In this embodiment, the glass concentrator mirror assembly 201 includes a plurality of glass mirrors $220_1$, $220_2$, $220_3$, and $220_4$, which are supported in a similar manner to the single glass mirror of FIGS. 1A and 1B. The most significant difference between FIGS. 1A and 1B collectively, versus FIG. 3 is that FIG. 3 has multiple mirrors while FIGS. 1A and 1B have only one mirror.

FIG. 3 shows that a single spine 230 and a single sternum 260 are capable of holding a number of mirrors. Thus, the glass concentrator mirror assembly concept is extendable to concentrating larger areas of light and equivalently creating longer lines of concentrated light. Generally, the stiffer the sternum 260, the more pressure that can be provided to the mirrors $220_1$, $220_2$, $220_3$, and $220_4$. The sternum 260 is disposed on the sunny/reflective side of the glass concentrator mirror assembly 201, while the spine 230 is disposed on the back side of the glass concentrator mirror assembly 201. It should be clear that, in lieu of the configuration in FIG. 3, multiple glass concentrator mirror assemblies, e.g., glass concentrator mirror assembly 201, can be positioned in a line (along the long axis in FIG. 3) to scale to even longer lines and larger areas.

Multiple glass mirrors $220_1$, $220_2$ through $220_n$ are provided in lieu of a single large mirror in order to provide a sufficient amount of force to curve the mirrors. The stiffer the sternum 260, the larger the mirror(s), e.g., $220_1$, $220_2$ through $220_n$, can be and have a sufficient amount of force for curvature.

In FIG. 3, two ribs are illustrated for each mirror. For example, mirror $220_1$ includes upper rib 242 and lower rib 244. Mirror $220_2$ includes upper rib 243 and lower rib 245. Mirror $220_3$ includes upper rib 246 and lower rib 248. Mirror $220_4$ includes upper rib 247 and lower rib 249. Rather than having two ribs for each of the four mirrors $220_1$, $220_2$, $220_3$, and $220_4$, the glass concentrator mirror assembly 201 could have two ribs for the entire glass concentrator mirror assembly 201. One rib could be situated at the top and the other rib could be situated at the bottom.

In FIG. 3, left stringer 252 and right stringer 254 are shown for mirror $220_1$, while additional stringers are shown for mirrors $220_2$, $220_3$, and $220_4$. However, it should be understood that a single stringer on each side, e.g., left stringer 252 and right stringer 254, may run the entire length of the glass concentrator mirror assembly 201 from top to bottom.

Similarly, by adding yet more mirrors, but this time in the perpendicular direction (but still in approximately the plane of the mirrors) it is possible and practical to scale in a different direction to yet larger areas of solar collection.

Figure 4:
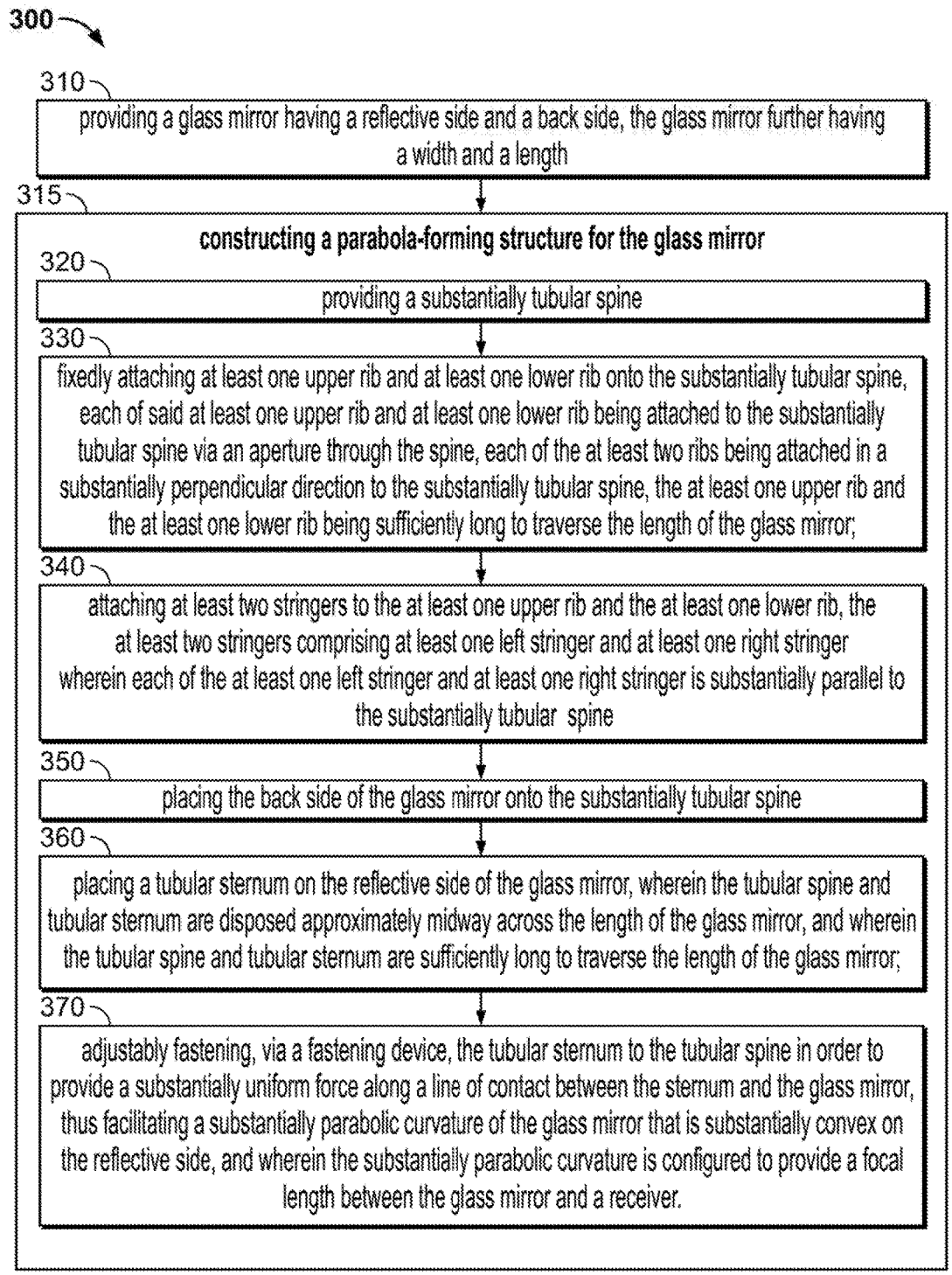
FIG. 4 is a flow chart of a method for making a glass concentrator mirror assembly in accordance with one embodiment of the present disclosure.

FIG. 4 illustrates a method for making a glass concentrator mirror assembly in accordance with one embodiment of the present disclosure. The method 300 includes, at step 310, providing a glass mirror having a reflective side and a back side, the glass mirror further having a width and a length. At step 320, the method also includes providing a substantially tubular spine. At step 330, the method includes fixedly attaching at least one upper rib and at least one lower rib onto the substantially tubular spine. Each of said at least one upper rib and at least one lower rib is attached to the substantially tubular spine via an aperture through the spine. Each of the at least two ribs is attached in a substantially perpendicular direction to the substantially tubular spine. The at least one upper rib and the at least one lower rib are sufficiently long to traverse the length of the glass mirror.

At step 340, the method includes attaching at least two stringers to the at least one upper rib and the at least one lower rib. The at least two stringers comprise at least one left stringer and at least one right stringer. Each of the at least two stringers has a first end and a second end. The first end of the at least one left stringer is attached to one of the at least two ribs pear at one end of the length of the glass mirror. It may be desirable to attach the stringers as close to the end of the length of the glass mirror as possible. Otherwise the ends of the mirror outside the stringers would be flat and would not concentrate sunlight. Therefore, a potentially large portion of the mirror would become ineffective in collecting light. It may also be desirable for the stringers to be aligned in parallel with the spine and/or sternum. The second end of the at least one left stringer is attached to another of the at least two ribs near the other end of the length of the glass mirror. The first end of the at least one right stringer is attached to one of the at least two ribs near one end of the length of the glass mirror. The second end of the at least one right stringer is attached to another of the at least two ribs near the other end of the length of the glass mirror.

At step 350, the method further includes placing the back side of the glass mirror onto the substantially tubular spine. At step 360, the method still further includes placing a tubular sternum on the reflective side of the glass mirror, wherein the tubular spine and tubular sternum are disposed approximately midway across the length of the glass mirror, and wherein the tubular spine and tubular sternum are sufficiently long to traverse the length of the glass mirror;

At step 370, the method includes adjustably fastening, via a fastening device, the tubular sternum to the tubular spine in order to provide a substantially uniform force along a line of contact between the sternum and the glass mirror, thus facilitating a substantially parabolic curvature of the glass mirror that is substantially convex on the reflective side, and wherein the substantially parabolic curvature is configured to provide a focal length between the glass mirror and a receiver.

Figure 5:
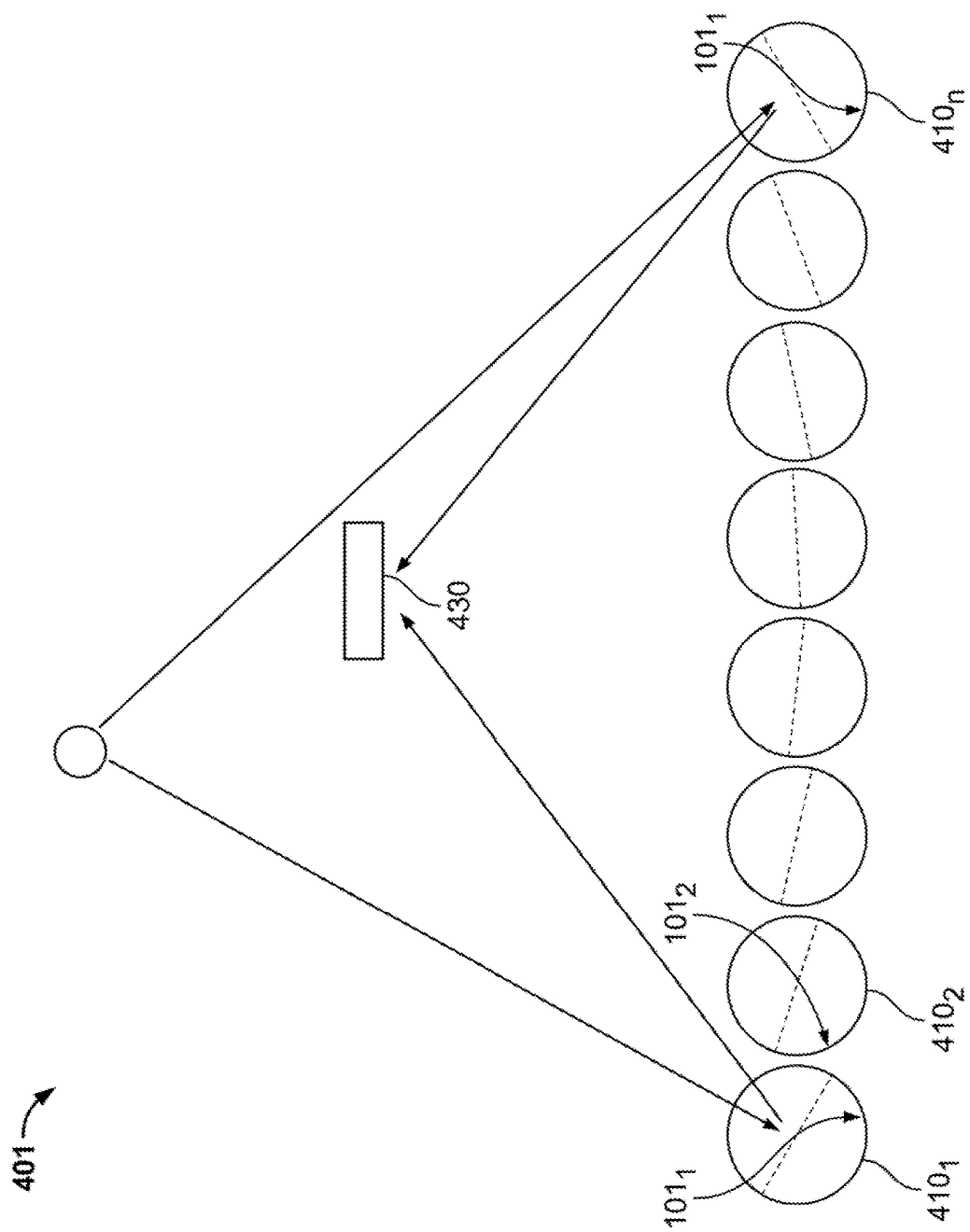
FIG. 5 shows a diagrammatic representation of a reflector system that comprises a set of ground mounted reflectors that are arrayed in parallel.

FIG. 5 illustrates a diagram of a reflector system 401 that comprises a set of ground mounted reflector assemblies $410_1$, $410_2$, through $410_n$, that are arrayed in parallel. In this embodiment of a reflector system 401, the reflector assemblies $410_1$, $410_2$, through $410_n$, include glass concentrator mirrors $101_1$, $101_2$ through $101_n$ as described in the present disclosure. The reflectors $410_1$, $410_2$, through $410_n$ may be driven collectively or individually, to track movement of the sun relative to the earth. The reflectors oriented to reflect incident solar radiation to a receiver 430. A glass concentrator mirror, e.g., $101_1$, $101_2$ through $101_n$, may be mounted on each of the reflectors $410_1$, $410_2$, through $410_n$.

Figure 6:
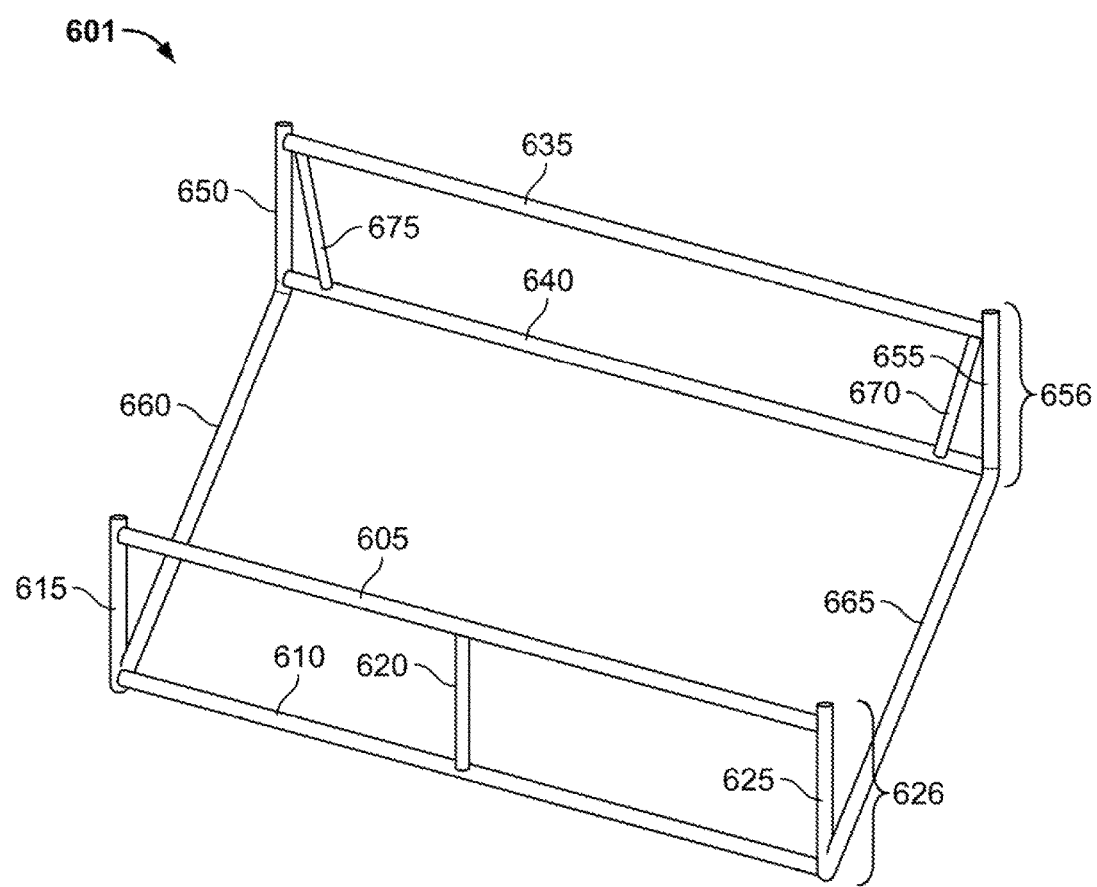
FIG. 6 illustrates a support frame which can be utilized with the embodiment shown in FIG. 5.

FIG. 6 illustrates a support frame 601 which can be utilized with the reflector assemblies in FIG. 5. Frame 601, is preferable built up from rigid elongated members 605, 610, 615, 620, 625, 630, 635, 640, 645, 650, 655, 660, and 665. Rigid elongated members 605, 610, 615, 620, 625 form a first end frame 626 which supports a solar tracking drive system illustrated and later detailed in FIG. 7. Furthermore, first end frame 626 provides mechanical support against gravity, wind and other environmental loads for optical reflecting units on a first end. Similarly, rigid elongated members 635, 640, 645, 650, and 655 form a second end frame 656, which supports the optical reflecting units on their opposite end. Rigid elongated members 660, and 665 serve to maintain proper spacing between (and vertical support for) first end frame 626 and second end frame 656. Additional structural integrity and rigidity can be provided by rigid elongated members 670 and 675. Elongated members can take many forms though tubular (e.g. cylindrical) will be suitable in many cases. Another form for elongated member that will generally suitable is extruded angle (e.g. "angle iron").

Elongated members have been successfully built and tested which in one example are made of plastic (e.g. ABS plastic, or more specifically water drainage pipe nominal 2" diameter). In such a construction example, joints between elongated members are provided by water drainage pipe joints and assemblies are fastened together with cement as is common in the plumbing art. Elongated members have also been successfully built and tested which are made of metal (e.g. steel, or more specifically EMT electrical conduit nominal ½" diameter).

Figure 7:
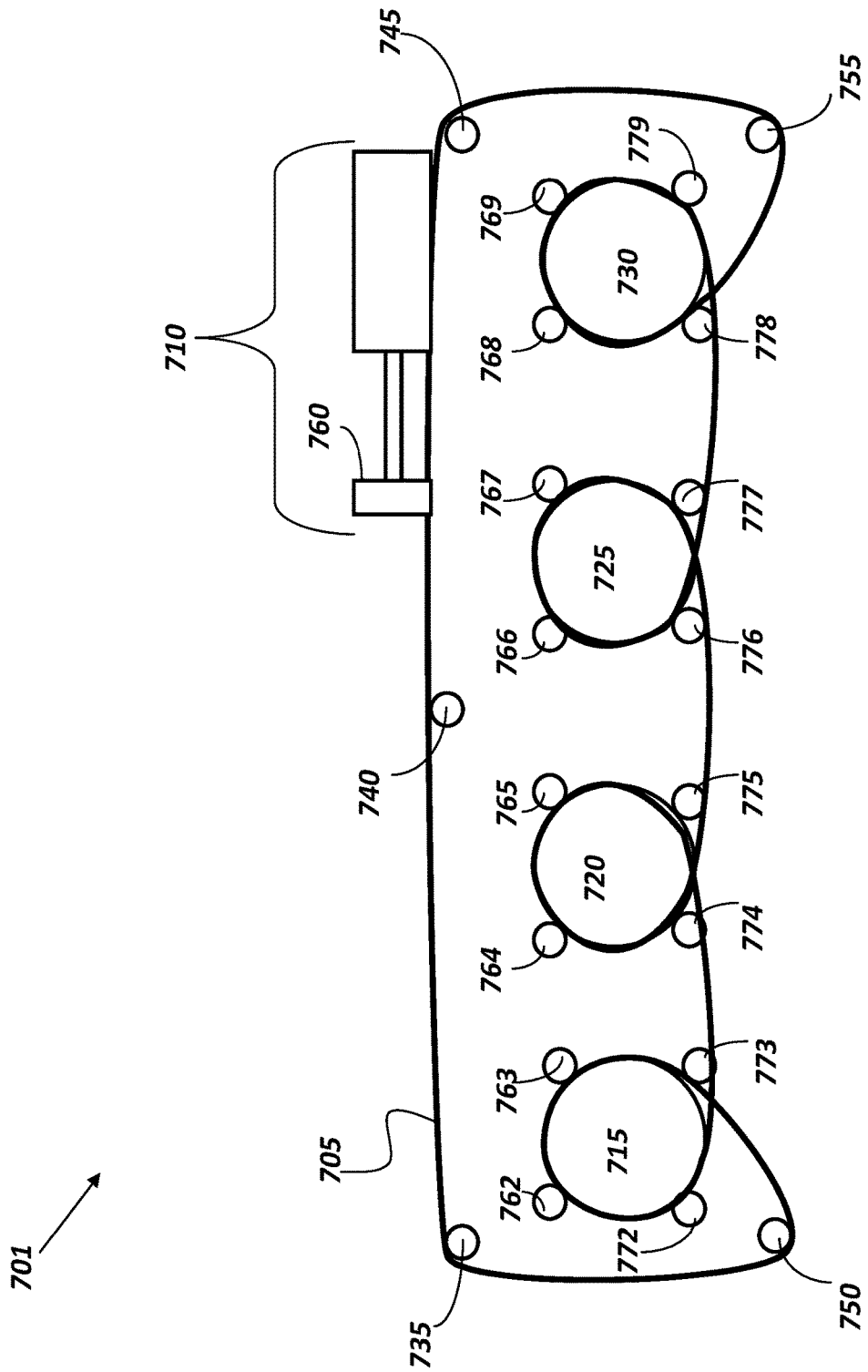
FIG. 7 shows a tracking/drive system which can be utilized with the embodiments shown in FIGS. 5 and 6.

FIG. 7 shows a tracking/drive system 701 which can be utilized with the embodiments shown in FIGS. 5 and 6. Tracking/drive system 701 uses cable loop 705 to couple the driving force of linear actuator 710 to rotate one or more rims exemplified by rims 715, 720, 725 and 730. Cable loop 705 can couple to rims in wide variety of circuit configurations, but FIG. 7 shows a one example of a circuit. It can be seen that the cable wraps around each of the rims 715, 720, 725 and 730 in turn. This full loop of wrapping around each rim (as opposed to simply wrapping around a small fraction of the circumference of each rim) ensures a tight and self-cinching grip which results in a high level of friction and thereby minimizes, if not completely eliminates, slip between the driving cable and the rotating rims.

To properly manage the motion of the cable, the cable loop 705 is wrapped around a set of pulleys 735, 740, 745, 750, and 755 which are affixed to a frame (not shown in FIG. 7). The rims 715, 720, 725 and 730 are preferably located at the ends of collector tubes (not shown in this figure) and more preferable a north end (assuming that the collectors tubes are oriented along a north-south axis and the system is in the northern hemisphere on the Earth), though they may also be located midway along such collector tubes (or any other location along the collector tubes for that matter).

There are two main reasons for having an end location for the rims 715, 720, 725 and 730. The first reason is that an end location gives easy access for maintenance of all of the parts of the tracking/drive system. The second reason is that locating the rims at the north end minimizes shadows cast by the rims (assuming that the collector's tubes are oriented along a north-south axis and the system is in the northern hemisphere on the Earth). In some situations, a central location for the rims along the collector tubes may be preferred. This preference would correspond to systems which have very long collector tubes and would be chosen to optimize the transfer of torque along the very long collector tubes.

Cable loop 705 is attached to a movement arm 760 of linear actuator 710, for example by a nut and bolt (not illustrated). Linear actuator 710 is also affixed to a frame (not shown in this figure) and can be any linear actuator as is commonly available in the solar tracking industry. Linear actuator 710 is preferably affixed to an upper portion or top of a frame to ease maintenance and to avoid being submerged when heavy rains might flood where the tracking/drive system 701 is located. A turnbuckle (not shown) could be utilized to provide tightening of the cable loop 705 by suitable adjustment.

To assure that the forces applied to the rims result in essentially pure rotation (i.e. with no significant translation), the rims 715, 720, 725 and 730 are supported and translationally constrained by casters 762, 763, 764, 765, 766, 767, 768, 769, 772, 773, 774, 775,776, 777, 778 and 779. The rims are preferably shaped like typical bicycle rims and can actually be bicycle rims. The casters preferably have wheels that are narrow enough to fit within the circumferential trough of the rims (i.e. the circumferential region around bicycle rims where bicycle tires are normally gripped by the rims).

Figure 8:
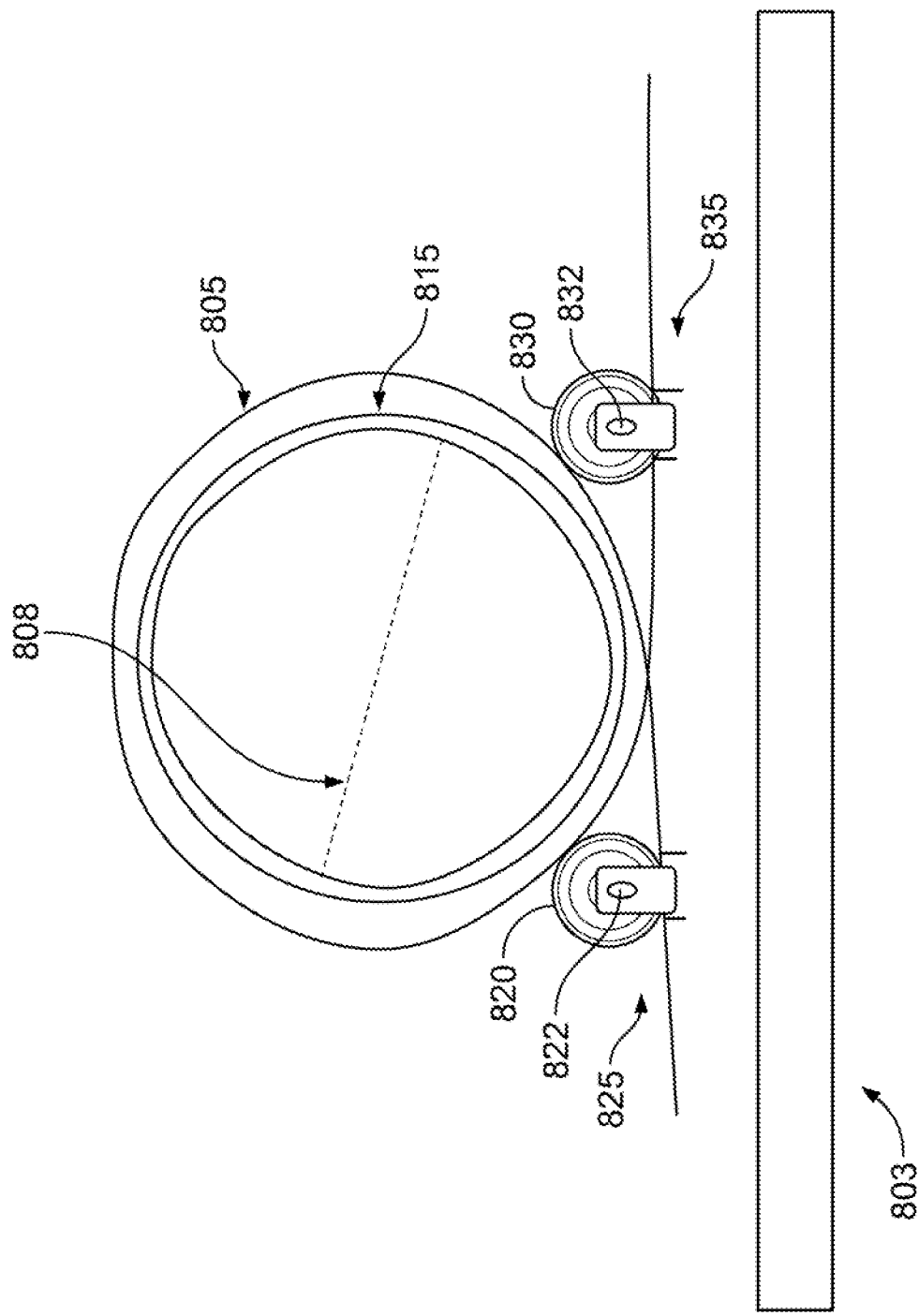
FIG. 8 shows an end, cross-sectional view of a portion of a drive/tracking system which can be utilized with the embodiments shown in FIGS. 5, 6 and 7.

FIG. 8 shows details of a tracking/drive system and more particularly, FIG. 8 shows an end, cross-sectional view of a portion of a drive/tracking system which can be utilized with the embodiments shown in FIGS. 5, 6 and 7.

In FIG. 8, a rim 815 is supported on rollers 820 and 830. The rim 815 is in contact with housing 808. The rollers 820 and 830 are parts of a first set of casters 825 and 835 respectively and supported by axels 822 and 832 respectively. Note that cable loop 805 wraps around the rim 815 and under both axels 822 and 832. This routing of the cable loop 805 ensures that rim 815 will remain located (held down) during a high wind gust. The first set of casters 825, 835 are affixed to the top portion of elongated support member 803. A second set of casters (not shown in FIG. 7) could be affixed at the top of rim 815 with another elongated support member (not shown) to provide still further support. It should be understood that the cable loop 805 is completely wrapped around the rim 815 to provide a gripping action, which enables controlled rotation of the rim 815 (and housing 808), thereby minimizing or eliminating translational movement.

Figure 9:
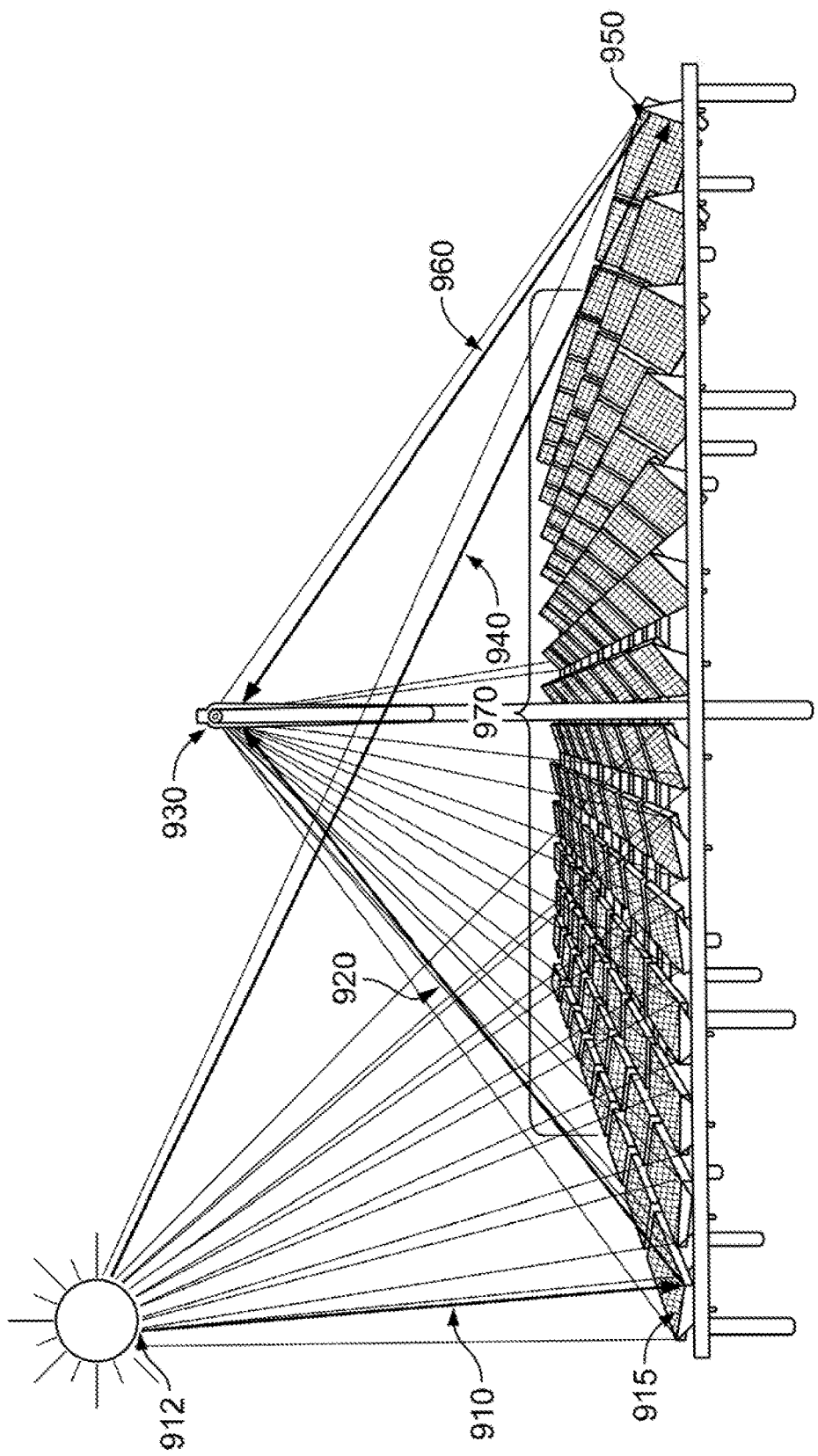
FIG. 9 illustrates an end view of a solar energy collection system, an example of an overall optical architecture of a system which can incorporate the glass concentrator mirrors of the present disclosure.

FIG. 9 illustrates an end view of a solar energy collection system. FIG. 9 is merely an example of an overall optical architecture of a system which can incorporate the glass concentrator mirrors of the present disclosure. In FIG. 9, a light beam 910 from the sun 912 reflects from glass concentrator mirror 920 in the mirror array 970. The light beam 910 is then reflected from glass concentrator mirror 915 to form reflected light beam 920, which travels to receiver 930. The reflected light beam 920 is focused or concentrated along the way. Similarly, other light beams are reflected onto each other mirror. For example, light beam 940 is reflected onto mirror 950 in the mirror array 970. Reflected light beam 960 is concentrated onto receiver 930. Other reflected light beams (not labeled) are also concentrated onto receiver 930.

Other embodiments of the present glass concentrator mirror for solar collectors could include single collector. Alternatively, the glass concentrator mirror assembly could be used when two tracking systems are desired for both ends of, for example, a solar collector array. Other embodiments of the present glass concentrator mirror assembly can apply to solar collectors of a broad range of configurations.

While the glass concentrator mirror assembly has been described in terms of a collector of solar energy which can work for both thermal and photovoltaic (and combination) energy systems, the glass concentrator mirror assembly can be used for other systems as well. One such system is radio frequency technology for either short range (e.g. radar) applications within the earth's atmosphere or long range application in outer space. The glass concentrator mirror assembly described herein could also be used with acoustic systems that have big reflectors. These acoustic systems may include a large dish that focuses sound on the glass concentrator mirror so users can hear much better.

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A glass concentrator mirror assembly configured to reflect sunlight to a receiver comprising:

at least one glass mirror, the at least one glass mirror having a reflective side and a back side;
a parabola-forming frame structure for the at least one glass mirror, the parabola-forming frame structure including:
a tubular spine;
a tubular sternum on the reflective side of the at least one glass mirror, the tubular sternum being adjustably fastened to the tubular spine with the at least one glass mirror therebetween, wherein the tubular sternum and the tubular spine are disposed approximately midway across the length of the at least one glass mirror, and wherein the tubular spine and the tubular sternum are sufficiently long to traverse the width of the at least one glass mirror;
at least one upper rib and at least one lower rib attached to the tubular spine, each of said at least one upper rib and at least one lower rib being attached to the tubular spine via an aperture through the spine, wherein the at least one upper rib and the at least one lower rib are sufficiently long to traverse the length of the at least one glass mirror;
at least two stringers comprising at least one left stringer and at least one right stringer, wherein each of the at least one left stringer and at least one right stringer is substantially parallel to the substantially tubular spine;
wherein the parabola-forming frame structure facilitates a substantially parabolic curvature of the at least one glass mirror, wherein the substantially parabolic curvature is configured to provide a focal length between the at least one glass mirror and a receiver, and
wherein the parabola-forming frame structure is configured to provide a substantially uniform force along a line of contact between the tubular sternum and the at least one glass mirror.

2. The glass concentrator mirror assembly of claim 1, wherein
the parabola-forming frame structure further includes an upper bolt and a lower bolt, and said upper bolt and said lower bolt fixedly fasten said tubular sternum to said tubular spine, and wherein said upper bolt and said lower bolt provide said substantially uniform force via said tubular sternum against said glass mirror.

3. The glass concentrator mirror assembly of claim 1, wherein
the at least two stringers are composed of metal tubes; and wherein the least one upper rib and the least one lower are composed of metal tubes.

4. The glass concentrator mirror assembly or claim 1, wherein
the tubular spine and tubular sternum are composed of metal.

5. The glass concentrator mirror assembly of claim 4, wherein
the silver layer is overcoated with an overcoat barrier layer.

6. The glass concentrator mirror assembly of claim 1, wherein
the at least one glass mirror includes a glass layer and a silver layer.

7. The glass concentrator mirror assembly of claim 1, wherein
the tubular sternum is composed of a material that is stiffer than the material of the at least one glass mirror.

8. A method of manufacturing a glass concentrator mirror assembly comprising the steps of:
providing a glass mirror having a reflective side and a back side, the glass mirror further having a width and a length;
constructing a parabola-forming frame structure for the glass mirror by:
providing a substantially tubular spine;
fixedly attaching at least one upper rib and at least one lower rib onto the substantially tubular spine, each of said at least one upper rib and at least one lower rib being attached to the substantially tubular spine via an aperture through the spine, each of the at least two ribs being attached in a substantially perpendicular direction to the substantially tubular spine, the at least one upper rib and the at least one lower rib being sufficiently long to traverse the length of the glass mirror;
attaching at least two stringers to the at least one upper rib and the at least one lower rib, the at least two stringers comprising at least one left stringer and at least one right stringer, wherein each of the at least one left stringer and at least one right stringer is substantially parallel to the substantially tubular spine;
placing the back side of the glass mirror onto the substantially tubular spine;
placing a tubular sternum on the reflective side of the glass mirror, wherein the tubular spine and tubular sternum are disposed approximately midway across the length of the glass mirror, and wherein the tubular spine and tubular sternum are sufficiently long to traverse the length of the glass mirror;
adjustably fastening, via a fastening device, the tubular sternum to the tubular spine in order to provide a substantially uniform force along a line of contact between the sternum and the glass mirror, thus facilitating a substantially parabolic curvature of the glass mirror, and wherein the substantially parabolic curvature is configured to provide a focal length between the glass mirror and a receiver.

9. The method of claim 8, wherein
the fastening device further includes an upper bolt and a lower bolt, and said upper bolt and said lower bolt fixedly fasten said tubular sternum to said tubular spine, and wherein said upper bolt and said lower bolt provide said substantially uniform force via said tubular sternum against said glass mirror.

10. The method of claim 8, wherein
each of said at least one upper rib and at least one lower rib is attached to the spine via an aperture through the spine.

11. The method of claim 8, wherein
the at least two stringers are disposed at opposite ends of the glass mirror.

12. The method of claim 11, wherein the at least two stringers are composed of metal tubes.

13. The method of claim 8, wherein
the at least two ribs are composed of metal tubes.

14. The method of claim 9, wherein
the glass mirror includes a glass layer and a silver layer.

15. The method of claim 14, wherein
the silver layer is overcoated with an overcoat barrier layer.

16. In a reflector assembly having a glass concentrator mirror assembly, the glass concentrator mirror assembly comprising:
   at least one glass mirror, the at least one glass mirror having a reflective side and a back side, the at least one glass mirror further having a width and a length;
   a parabola-forming frame structure that includes:
      a tubular spine on the back side of the at least one glass mirror,
      a tubular sternum on the reflective side of the at least one glass mirror, wherein the tubular sternum is adjustably fastened to the tubular spine, wherein the tubular spine and the tubular sternum are disposed approximately midway across the length of the at least one glass mirror, and wherein the tubular spine and tubular sternum are sufficiently long to traverse the width of the at least one glass mirror;
      at least one upper rib and at least one lower rib attached to the tubular spine, each of said at least one upper rib and at least one lower rib being attached to the tubular spine via an aperture through the spine, wherein the at least one upper rib and the at least one lower rib are sufficiently long to traverse the length of the at least one glass mirror;
      at least two stringers comprising at least one left stringer and at least one right stringer, wherein each of the at least one left stringer and at least one right stringer is substantially parallel to the substantially tubular spine;
      an upper bolt and a lower bolt, said upper bolt and said lower bolt fixedly fastening said tubular sternum to said tubular spine, said upper bolt and said lower bolt providing a substantially uniform force via said sternum against said at least one glass mirror;
   wherein the parabola-forming frame structure facilitates a substantially parabolic curvature of the at least one glass mirror, the substantially parabolic curvature being configured to provide a focal length for the at least one glass mirror.

17. The reflector assembly of claim 16, wherein the at least two ribs and the at least two stringers are each composed of metal tubes.

18. The reflector assembly of claim 16, wherein the at least one glass mirror includes a glass layer, a silver layer and an overcoat barrier layer.

* * * * *